Figure 1:
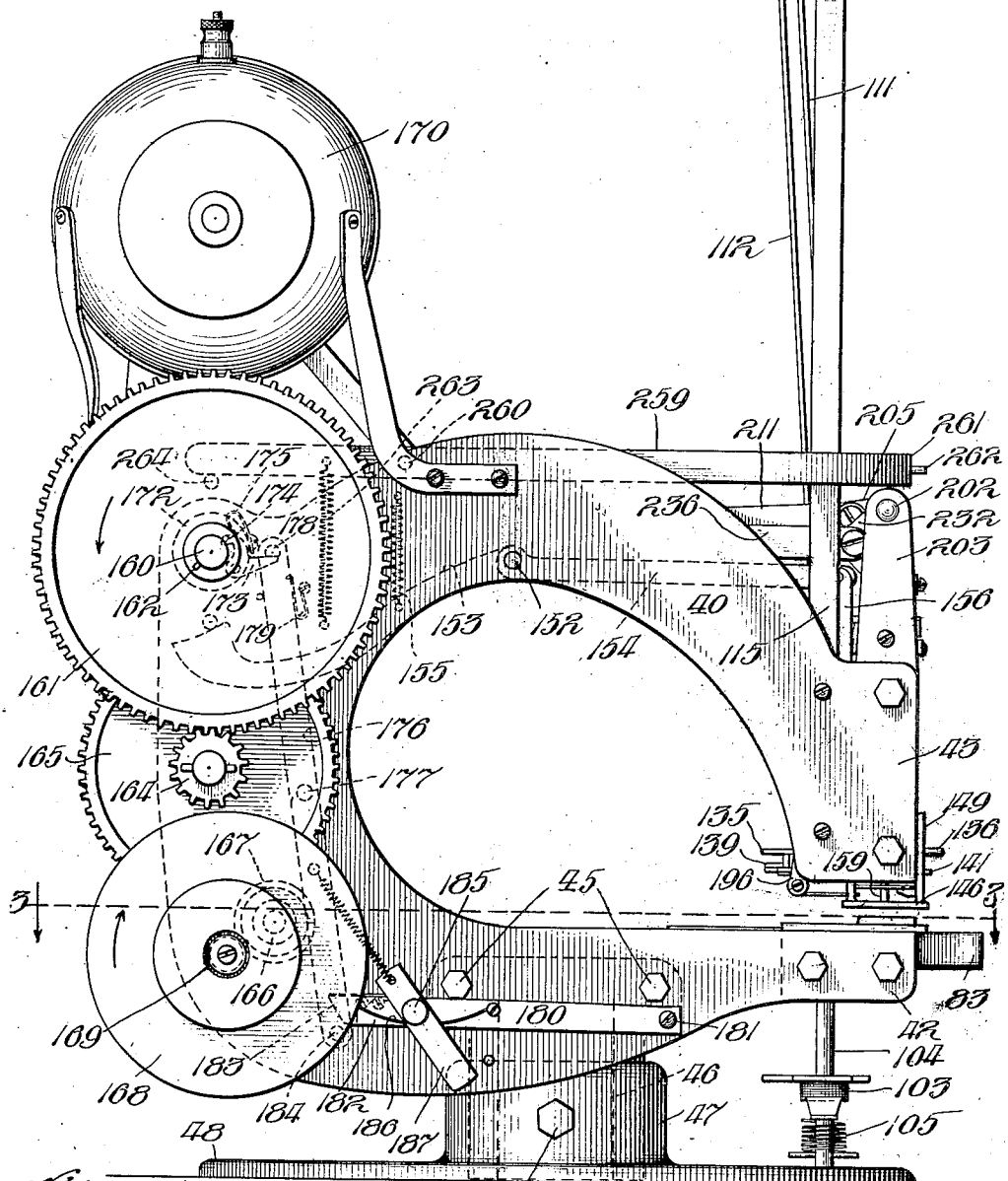

J. KELLER.
EYELETING MACHINE.
APPLICATION FILED MAY 14, 1912.

1,112,704.

Patented Oct. 6, 1914.
10 SHEETS—SHEET 2.

Witnesses:
Harry S. Gaither
Ephraim Banning

Inventor:
Jeremiah Keller
by Banning & Banning
his Attys

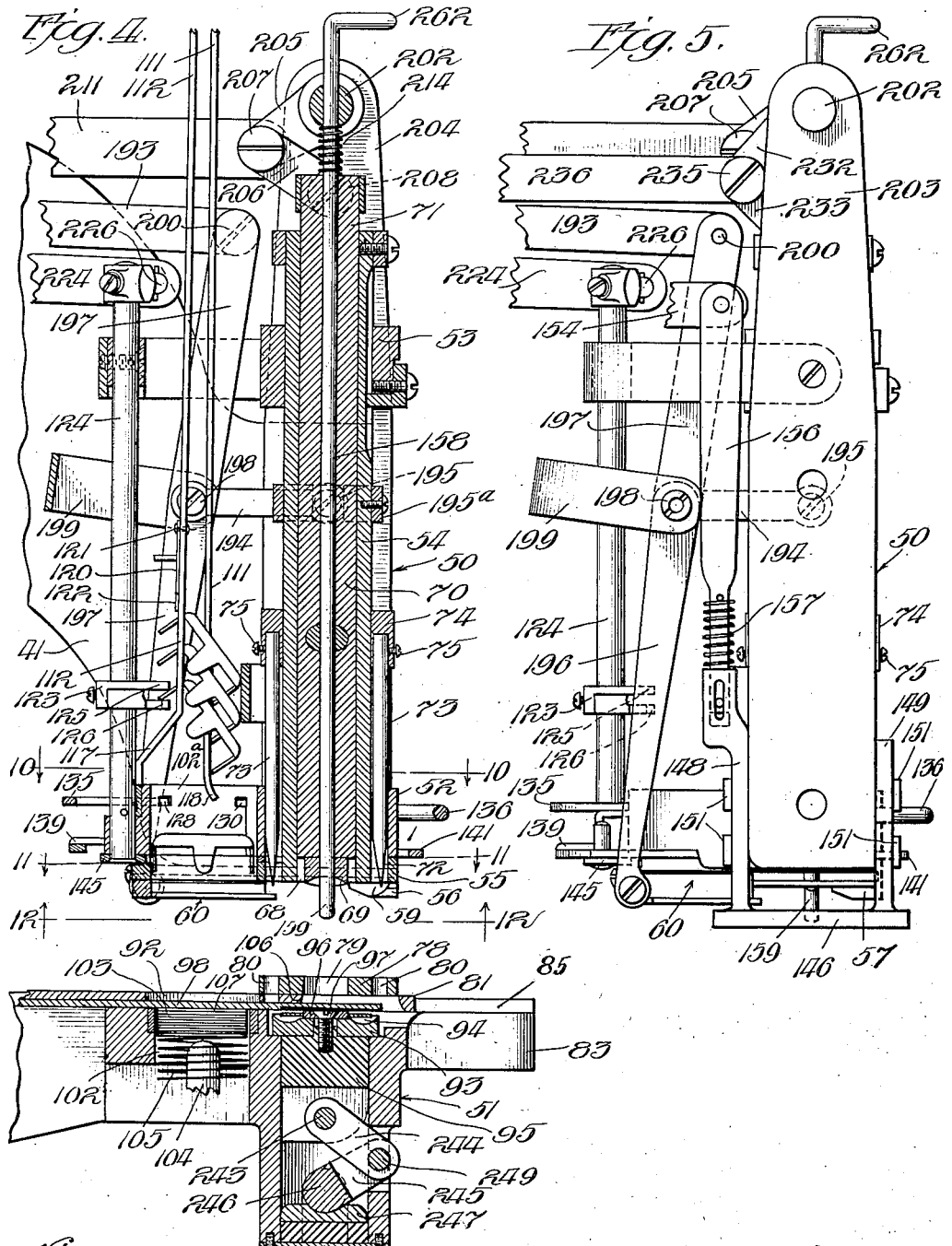

J. KELLER.
EYELETING MACHINE.
APPLICATION FILED MAY 14, 1912.

1,112,704.

Patented Oct. 6, 1914.
10 SHEETS—SHEET 4.

Witnesses:
Harry S. Gaither
Ephraim Banning

Inventor:
Jeremiah Keller
by Banning & Banning
his Attys

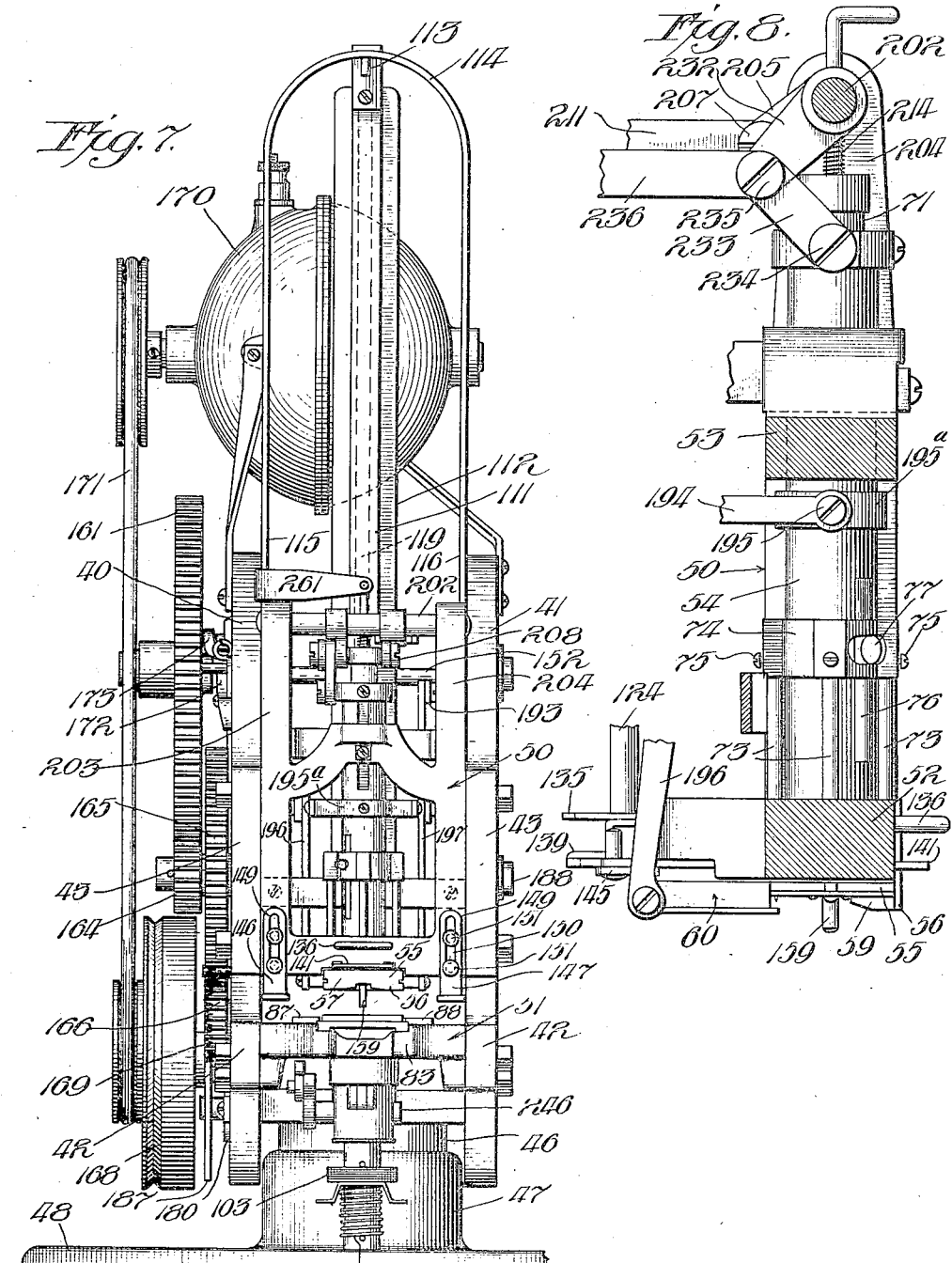

J. KELLER.
EYELETING MACHINE.
APPLICATION FILED MAY 14, 1912.
1,112,704.
Patented Oct. 6, 1914.
10 SHEETS—SHEET 6.
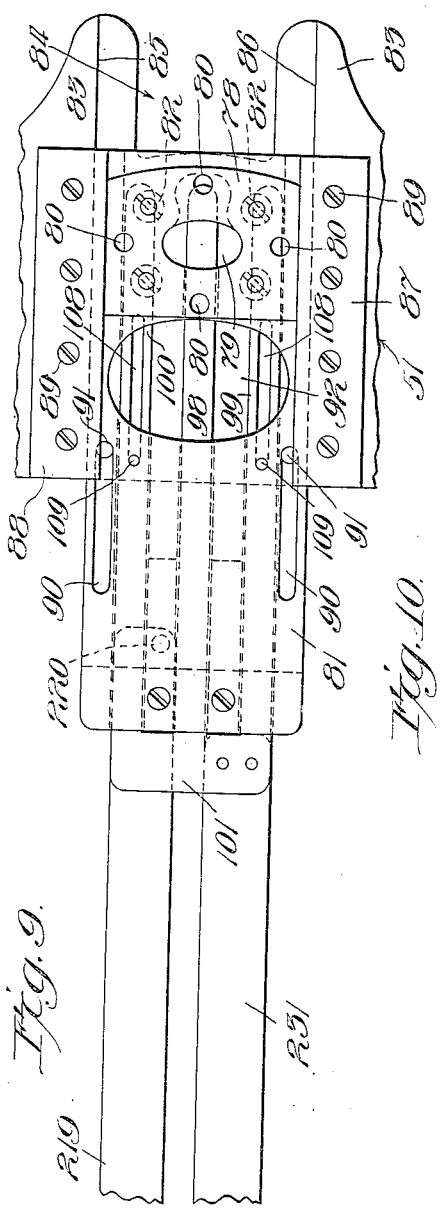
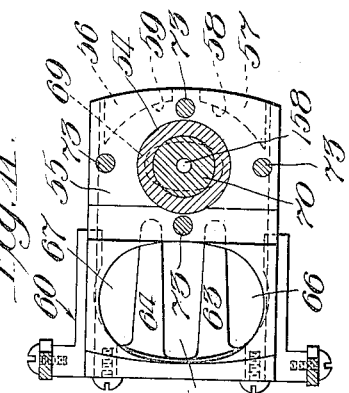
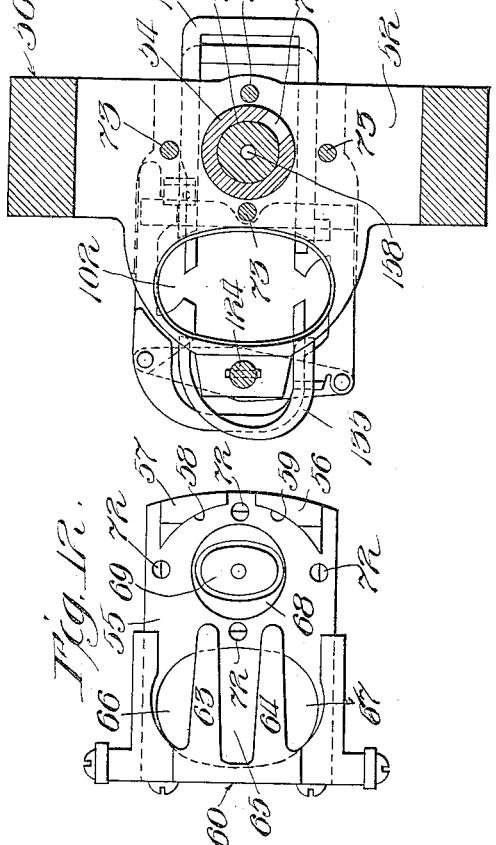

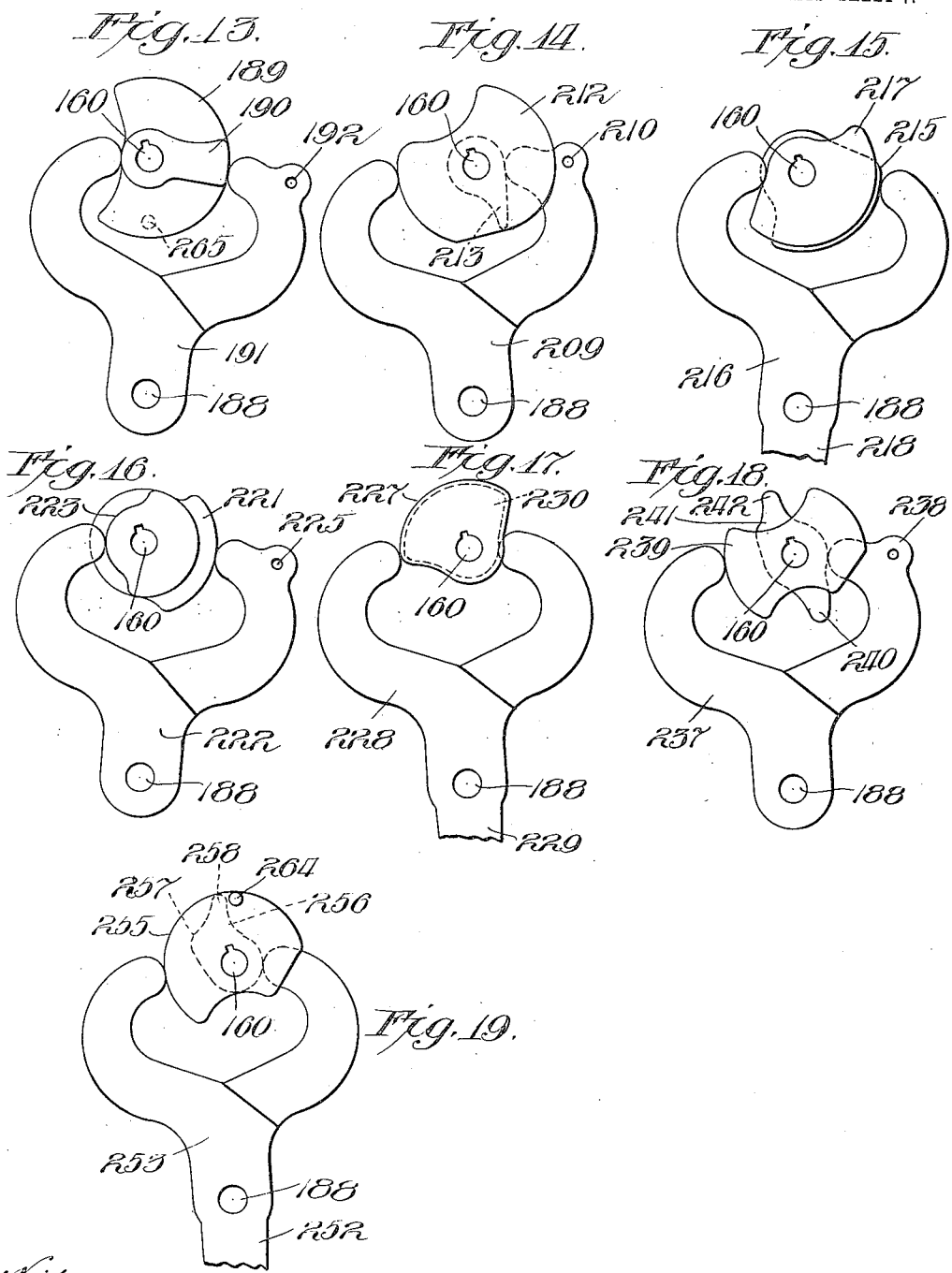

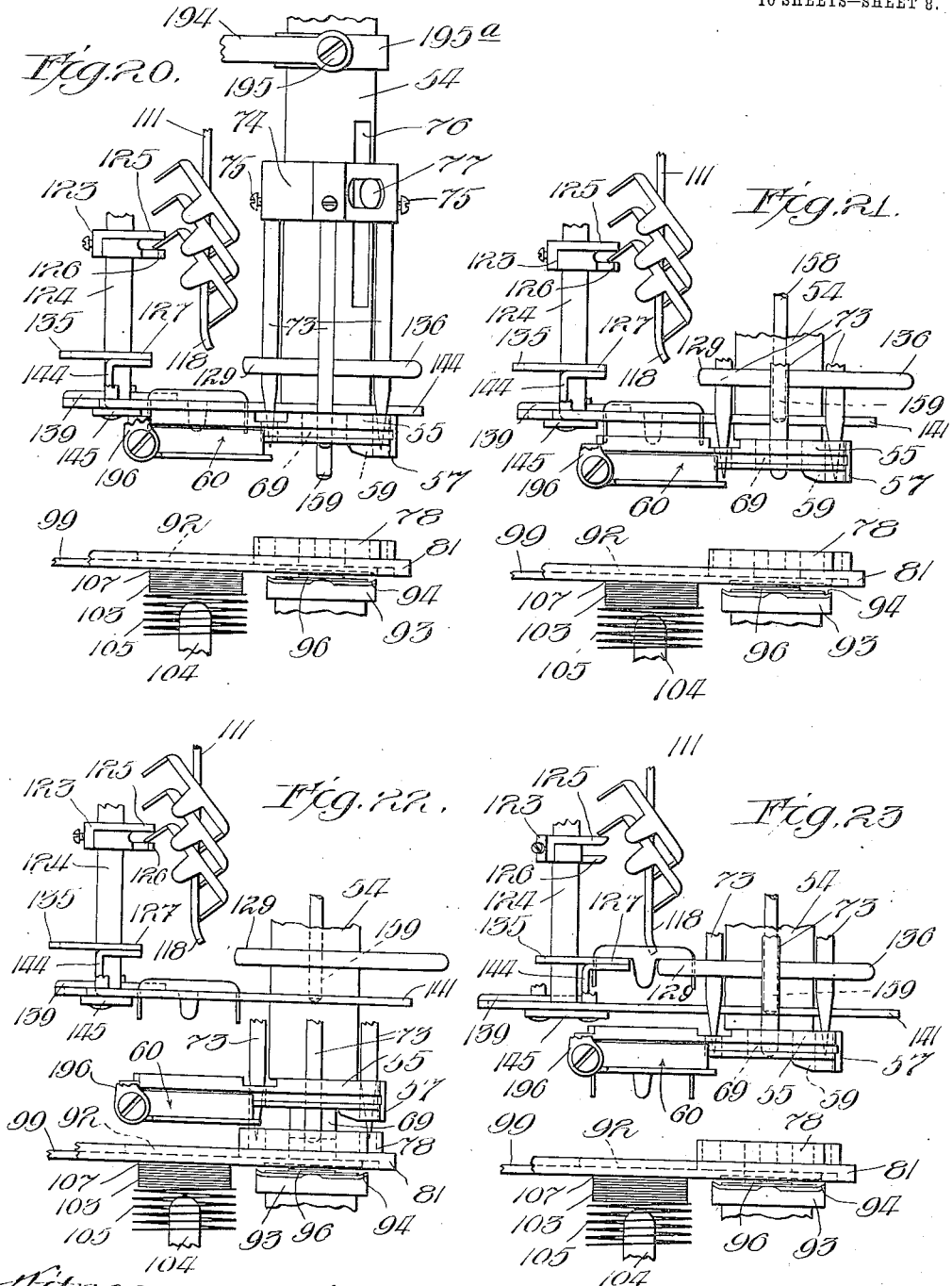

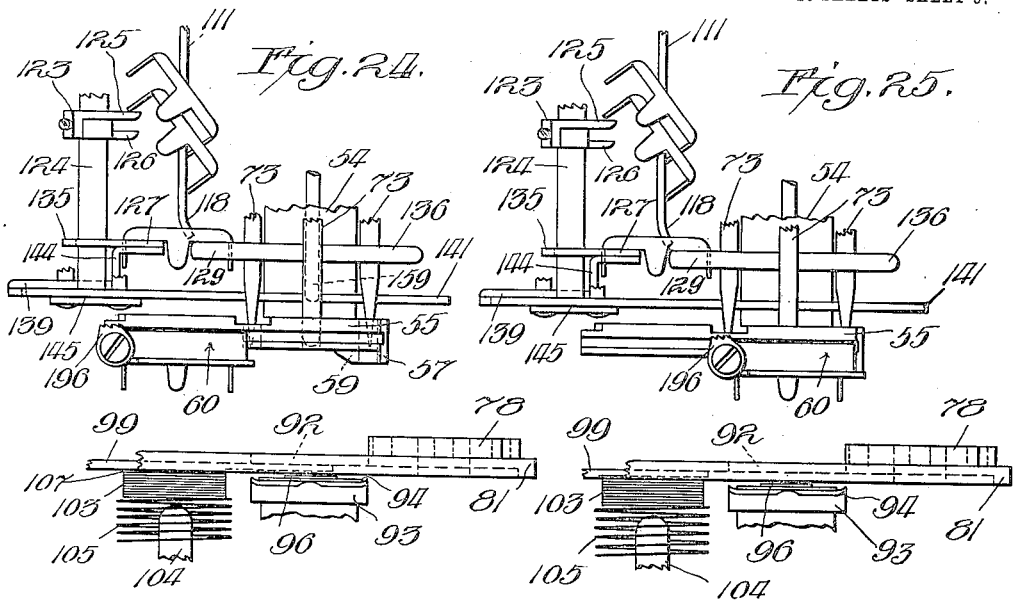
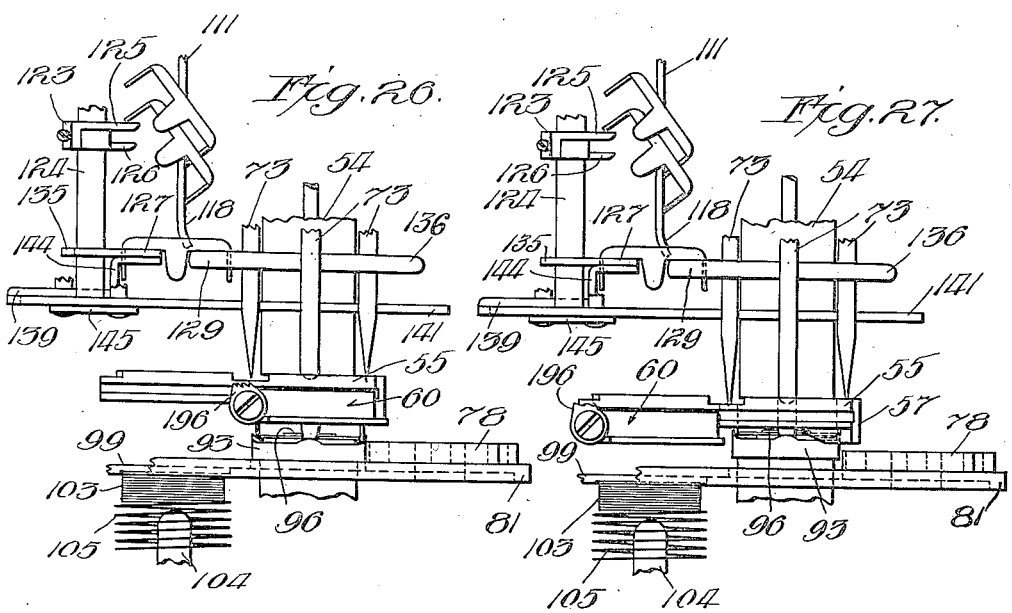

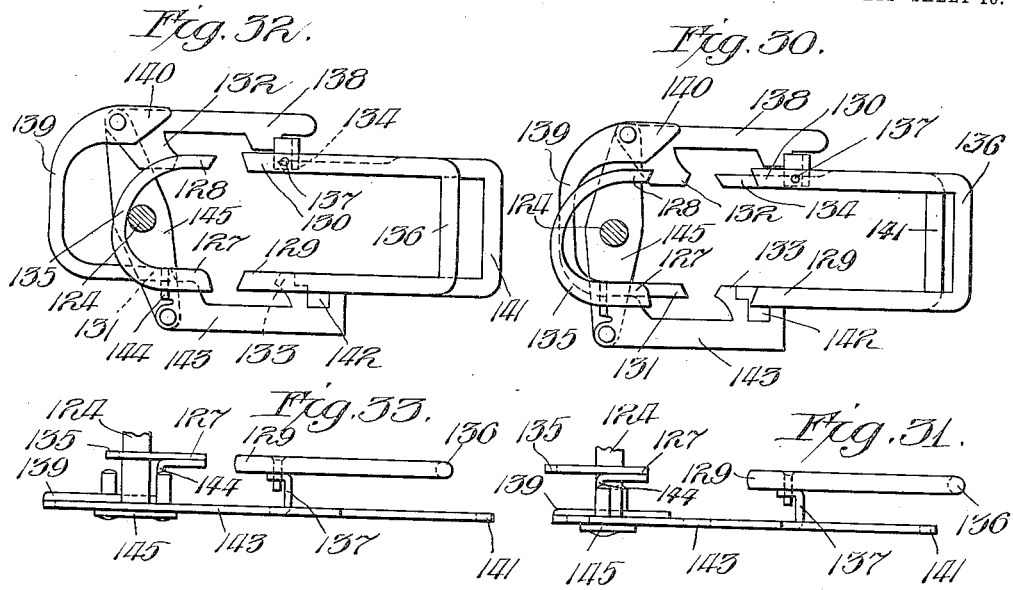
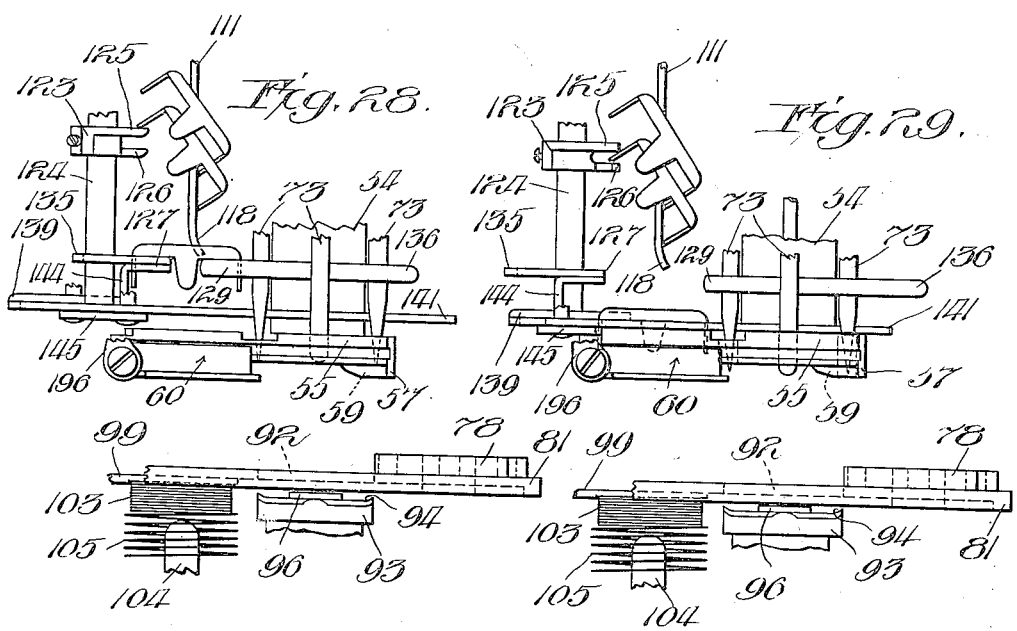

UNITED STATES PATENT OFFICE.

JEREMIAH KELLER, OF CHICAGO, ILLINOIS, ASSIGNOR TO HANSON & ZIMMERS, OF CHICAGO, ILLINOIS, A COPARTNERSHIP COMPOSED OF PETER HANSON AND JOSEPH B. ZIMMERS.

EYELETING-MACHINE.

1,112,704.  Specification of Letters Patent.  Patented Oct. 6, 1914.

Application filed May 14, 1912. Serial No. 697,270.

*To all whom it may concern:*

Be it known that I, JEREMIAH KELLER, a citizen of the United States, residing at Chicago, in the county of Cook and State of Illinois, have invented certain new and useful Improvements in Eyeleting-Machines, of which the following is a specification.

The present invention has reference to a machine for placing eyelets in cloth, paper, card-board, or other similar material.

The invention has reference more particularly to a machine for accomplishing the aforementioned results when the eyelet is of that form in which a portion of the fabric or material must first be punched out and cut entirely away.

More particularly also the invention has reference to a machine for placing that form of eyelet which comprises two members, one of which seats against one face of the cloth or fabric, and the other of which seats against the other face thereof, and is joined or clamped to the first member. Such eyelets are used, for example, in buggy and automobile tops. As thus used a suitable catch or wing fastened to the frame of the buggy is passed through the hole of the eyelet, and then turned to overlie a portion of the same in order to fasten the top to the buggy frame. A machine for placing this form of eyelet must be so constructed that the cloth or fabric will be completely cut away at a point to register with the hole of the eyelet. If this cloth were not cut away, but simply doubled or folded back, it would form a large mass or thickness at an inconvenient point in the fabric, and would thus obstruct or hinder the proper setting of the eyelet, and its subsequent use in locking the top in position on the automobile or carriage frame.

One of the main objects of this invention is to provide a machine which will cut away this excess material to provide a clean hole which will subsequently be surrounded by the eyelet.

As previously stated, one of the objects of the invention is to provide a machine for setting that form of eyelet which comprises two members which are seated in co-active relation against the opposite faces of the fabric.

Therefore, another object of the invention is to provide a machine which will feed in these two members of the eyelet on the opposite faces of the cloth at the proper instants of time, so that they may be subsequently clamped and riveted together.

Another object of the invention is to provide a machine which shall be completely automatic in all its movements, so as to minimize the labor and time necessary to perform the eyeleting operation. To this end, it is desired that the two members of each eyelet shall be automatically fed into their proper positions in proper sequence, so that they may afterward be clamped or riveted together and secured to the fabric.

I will not now go farther into detail as to the various objects and uses to be attained by my machine, but it will become apparent from a further study of the specification and drawings that many other useful objects may be accomplished, and many other useful results attained by the construction which is herein shown and described. Therefore, other objects and uses will appear from a detailed description of the invention which consists in the features of construction and combination of parts hereinafter described and claimed.

In order to facilitate an understanding of the drawings and the working of the machine, I shall hereinafter designate the major portion of the complete eyelet as the grommet, and the other portion thereof as the washer. By the use of these terms, I do not in any wise restrict myself to the form of eyelet which is herein shown and described, as it will become manifest that the machine might be used for placing other forms of eyelet.

Figure 2:
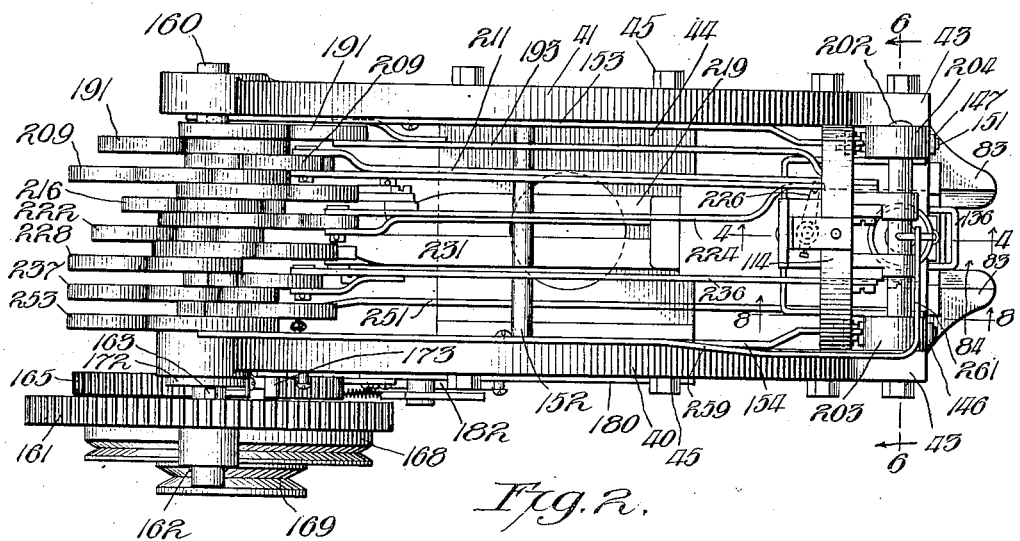
Figure 3:
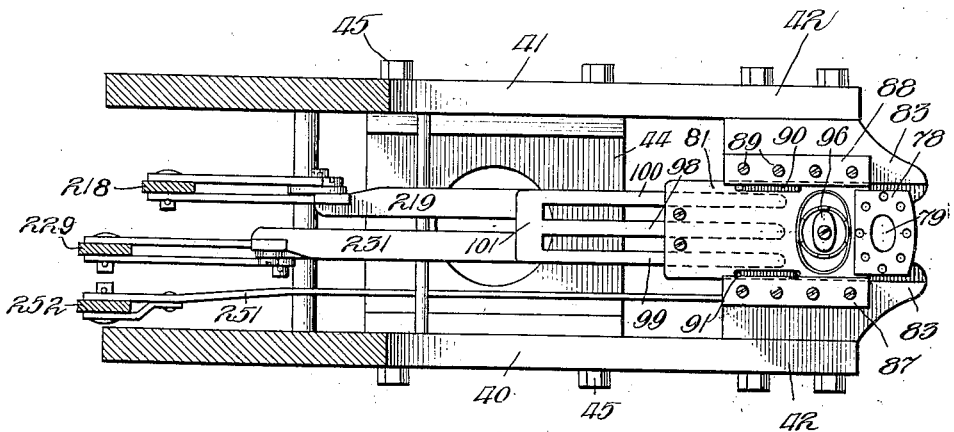

Referring now to the drawings, Figure 1 shows a side elevation of the completed machine, looking at the side on which the gearing or other operating mechanism is placed, all parts standing in their normal position; Fig. 2 shows a plan view of the completed machine with the parts standing in their normal position; Fig. 3 shows a section taken on the line 3—3 of Fig. 1, looking in the direction of the arrows, the female die being thrown forward out of normal position; Fig. 4 shows an enlarged longitudinal detail section of the forward portion of the machine taken on the line 4—4 of Fig. 2, looking in the direction of the arrows; Fig. 5 shows an enlarged side detail of the yoke-head and associated parts, the latter standing in normal position; Fig. 11

6 shows an enlarged section taken on line 6—6 of Fig. 2, looking in the direction of the arrows; Fig. 7 shows a front view of the machine, looking directly at the jaws, all parts standing in their normal position; Fig. 8 shows an enlarged section taken on line 8—8 of Fig. 6, looking in the direction of the arrows; Fig. 9 shows an enlarged detail plan view of the female die and washer feeding mechanism; Fig. 10 shows a section taken on the line 10—10 of Fig. 4, looking in the direction of the arrows, the gromet being removed; Fig. 11 shows a section taken on the line 11—11 of Fig. 4, looking in the direction of the arrows; Fig. 12 is a bottom view of the press-head, gromet carrier, and associated parts, as seen on the line 12—12 of Fig. 4, looking in the direction of the arrows; Fig. 13 is a detail elevation of the cams and yoke for operating the gromet carrier; Fig. 14 is a detail elevation of the cams and yoke for operating the male die; Fig. 15 is a detail elevation of the cams and yoke for moving the female die back and forth; Fig. 16 is a detail elevation of the cams and yoke for operating the dropping mechanism; Fig. 17 is a detail elevation of the cams and yoke for operating the washer feeding mechanism; Fig. 18 is a detail elevation of the cams and yoke for operating the press-head; Fig. 19 is a detail elevation of the cams and yoke for raising and lowering the anvil; Figs. 20 to 29 inclusive, are diagrammatic side elevations, showing the main operative parts in ten consecutive positions which constitute a complete cycle of movements of such parts; Fig. 30 is a plan skeleton view of the gromet dropping mechanism in its normal position; Fig. 31 is a side view corresponding to Fig. 30; Fig. 32 is a plan view of the gromet dropping mechanism in reverse position; and Fig. 33 is a side view corresponding to Fig. 32.

As previously stated, the machine of the present invention is intended for placing eyelets which comprise two separate and distinct members, one of which, herein termed the gromet, is placed against one face of the cloth or other fabric, and the other of which, herein termed the washer, is placed against the other face of the fabric, and suitably united or secured to the first member. As previously stated also, the machine is intended to place eyelets of that form in which a portion of the fabric or cloth is first cut completely away from the body thereof to provide a clean hole which registers with holes in the gromet and washer.

In order to place an eyelet of this kind, I have provided a number of main or major elements or mechanisms and suitable operating mechanism for causing them to successively assume the desired relative positions. These major elements are a male die and a female die, by means of which the hole is first punched in the fabric; the gromet carrier, by means of which one of the major elements of the eyelet is fed into position after the fabric has been punched; a washer feeding mechanism, by means of which the other element of the eyelet is fed into position; a press-head and an anvil, by means of which the gromet and washer are subsequently forced together and interlocked, at the same time clamping the fabric between them. Besides these main elements, there are provided a number of minor ones, such as means for clamping the fabric in fixed position with respect to the dies and other major elements, so that after the fabric has been punched the gromet and washer will be properly and accurately placed; a gromet dropping mechanism or feeder, by means of which the gromets are fed one at a time into the carrier; and other minor elements.

In order to more readily understand the detail construction of the entire machine, I shall first describe briefly the several positions illustrated in Figs. 20 to 29 inclusive. I shall then proceed to describe in detail the particular construction of mechanism herein adopted to accomplish the desired movements of the major elements hereinbefore referred to.

In Fig. 20, the major elements are shown in their normal or initial position,—that position which they occupy when the eyeleting mechanisms are at rest. In this figure, the male die, press-head, and gromet carrier are in raised position, the carrier being at its rearmost movement; a gromet stands in position ready to drop into the carrier; the indicating rod is in lowered position to facilitate an exact placing of the fabric in the machine, so as to insure a proper placing of the eyelet; the anvil is in lowered position; and the female die stands in its normal position.

In Fig. 21, the next movement is illustrated. In this case, the press-head, carrier, and male die have traveled down a slight distance, but the indicating rod has raised up entirely out of the way, so as not to interfere with any further movements of the mechanisms. The gromet dropping mechanism, female die and anvil remain in the same positions as in Fig. 20.

In Fig. 22, the press-head has traveled down fairly close to the female die, but the male die has traveled at a greater speed than the press-head, so that the fabric has been punched. In this case also, the dropping mechanism is in the same position as in Figs. 20 and 21, the gromet carrier is still in its rearmost position, and the female die and punch are in initial position.

In Fig. 23, the press-head has raised some distance, but the male die has raised at a greater speed, so that it has drawn into the press-head to strip the cloth from the die. In this case also, the gromet carrier still remains in its rearmost position, but the dropping mechanism has reversed position to drop a gromet into the carrier.

In Fig. 24, the mechanisms are in substantially the same position as in Fig. 23, with the exception that the female die has been thrown forward out of the way of the anvil, and the washer feeding mechanism has started to draw rearward preparatory to bringing forward another washer.

In Fig. 25, the gromet carrier has been thrown forward to carry and support a gromet immediately beneath the press-head; the press-head, and gromet carrier have started to lower; and the washer feeding mechanism has completed its rearward movement.

In Fig. 26 the anvil has started to move up to meet the press-head and gromet carrier, and the latter mechanisms have moved down toward the anvil such a distance that the prongs of the gromet have been securely clamped or gripped between the press-head and the anvil.

In Fig. 27, the gromet carrier has drawn back out of the way, and the press-head and anvil have completed their movements to rivet the gromet and washer together.

In Fig. 28, the press-head and gromet carrier have raised practically their full amount and the dropping mechanism still remains in the position which it occupied in the change from Fig. 22 to that of Fig. 23.

In Fig. 29, the mechanisms remain in substantially the same position as in Fig. 28, except that the dropping mechanism has reversed position to drop the gromet from the upper to the lower fingers of the dropper. The next change will be from the position of Fig. 29 to that of Fig. 20, during which change the female die will be drawn back into its initial position, and the washer feeding mechanism will be forced forward to feed a washer into position on the anvil preparatory to the next set of operations.

Having thus described in outline the several major movements which are given to the more important mechanisms, I shall now describe more in detail those mechanisms and the means herein disclosed for securing their proper relative movements.

The frame of the mechanism comprises a pair of side yokes 40 and 41, which have their forward ends separated a desired distance to permit the cloth or other fabric to be easily manipulated. Each lower forward end 42 extends forward in practically a direct line, while each upper forward end 43 extends down toward the corresponding lower end. These side frames are suitably joined to a central base member 44, by means of tap bolts 45, the base member being preferably provided with a neck 46 adapted to seat nicely in the boss 47 of a base plate 48. By means of this construction, the entire machine may be rotated into any desired position, although a tap nut 49 may be used to lock the mechanism in any given position.

The side frame or yokes are cut away in their central portions to provide a large open space unobstructed by any mechanism, and adapted to accommodate a considerable amount of cloth or other fabric being operated upon. The main operative elements are carried by a pair of members 50 and 51 which may be suitably secured to the forward ends of the yokes. The member 50 occupies the space between the upper forward ends 43, while the member 51 occupies the space between the lower forward ends 42. The male die, press-head, gromet feeding mechanism, gromet carrier, and indicating rod are associated with the member 50, while the female die, anvil, and washer feeding mechanism are associated with the member 51.

The member 50 is provided with a lower cross piece 52 and a central cross piece 53 which serve to reinforce it, and serve also as bearings or guide ways for guiding certain members in their vertical movements. A sleeve or rod 54 slides directly in the bearings thus provided, its upper end extending somewhat above the cross piece 53, and its lower end extending below the cross piece 52. This lower end 55 is flared or expanded out to provide a press-head, the width of which measured from side to side of the machine is somewhat greater than the diameter of the sleeve portion, and the length of which measured from forward to back is somewhat greater than the width. Figs. 11 and 12 best illustrate this press-head. As shown particularly in Fig. 12, it is provided with downwardly extending projections 56 and 57 in its forward portion, the inner edges 58 and 59 of which are curved to conform substantially to the contour of the gromet, and serve to limit the forward movement thereof, so as to insure an accurate placing of the gromet with respect to the press-head.

The gromet carrier comprises a member 60 having its edges 61 and 62 inturned and slidably mounted in horizontally extending grooves in the sides of the press-head. By means of this construction the gromet carrier can slide back and forth with respect to the press-head, but must rise and fall with it. The gromet carrier is provided with a pair of horizontally extending fingers 63 and 64 which provide a space 65 between them, and provide the spaces 66 and 67 at their sides. The ears or prongs of the gromet depend in these spaces, so that when the gromet is carried by the carrier, the fingers 63 and 64 support it. This arrangement will be well understood from Fig. 11, which is a view looking directly down on the fingers.

The central portion of the press-head is cut away to provide the hole 68, as shown in Fig. 12, which hole is of sufficient size to freely accommodate the male die 69. A rod 70 is slidably mounted within the sleeve or tube 54, and carries the male die at its lower end. The upper end 71 of this rod extends beyond the upper end of the sleeve to thereby provide a portion to which the operating mechanism for the die may be connected. By means of this construction, the rod and die can have a vertical movement with respect to the sleeve, press-head, and gromet carrier, or the two members—the sleeve and associated parts, and the rod and die—can travel together.

The press-head is provided with a number of holes 72, best shown in Fig. 12, other holes being provided immediately above them in the cross piece 52. These holes accommodate punch rods 73, the lower ends of which are tapered to provide wedge edges, and the function of which rods is to cut or perforate the cloth or fabric at points surrounding the portion which is cut away by the male die, through which perforations the ears or lugs of the gromet will pass. It is intended that these several rods 73 shall travel up and down together and simultaneously with the male die. To attain this result, a collar 74 surrounds the sleeve 54, the upper ends of the rods 73 being secured to this collar, as by means of set-screws 75. Referring particularly to Figs. 8 and 20 to 29 inclusive, it will be seen that a slot 76 is provided in the sleeve 54. A pin 77 rides freely in this slot, having its inner end rigidly secured to the rod 70 and its outer end engaging a perforation of the collar. By this construction, the collar is forced to travel up and down in exact synchronism with the movements of the rod 70, and, therefore, the rods 73 must travel in synchronism with the male dies.

From the above construction, it will be apparent that each time the male die operates, it will cut away a central portion from the fabric according to its shape, and at the same time the fabric will be perforated at a number of points around this cut-away portion, which perforations will ultimately accommodate ears or prongs of the gromet.

A female die must be properly associated with the male die to secure the proper punching and perforating operation. To this end, I have provided the die plate 78 having a central opening 79 corresponding to the male die, and a plurality of openings 80 corresponding to the rods 73. This plate is rigidly secured to a traveling plate 81, as best shown in Figs. 3, 4, 6, and 9. For this purpose, screws 82 are extended upwardly from the traveling plate into the die plate, so that the upper surface of the latter may be perfectly flush.

The member 51 has its forward end formed, as best shown in Figs. 2 and 9, to provide the forwardly extending lugs 83 which provide the space 84 between them. The slidable plate is mounted to travel in a forward and back direction on its member 51, grooves 85, and 86 serving to guide the plate in such travel. A pair of bars 87 and 88 are suitably secured to the member 51, as by means of screws 89, these bars overlying the edge of the slidable plate to prevent it from rising away from the member 51. The slidable plate is provided with a pair of guide slots 90 which engage upwardly extending pins 91 of the member 51 to more perfectly guide the slidable plate. By means of this arrangement, the plate is accurately limited in its back and forth movements, so that, if means are provided for forcing the plate in either direction until the ends of these slots strike said pins, assurance will be had that the slidable plate is accurately positioned either forward or back.

In the initial position of the machine, that shown in Fig. 20, the female die plate, and also the slidable plate, occupy the position shown in Fig. 9. In this position, the dies are in co-active relation for punching purposes. After the punching operation has been completed, the slidable plate will be thrown forward into the position of Fig. 3, where the perforations of the female die plate will overlie the open space 84 between the projections 83. In this position, the waste material cut away from the cloth or other fabric can drop down through the opening 84 to a suitable receptacle, it being prevented from falling through the female die plate until the latter has been thrown forward, by mechanism which will be presently described. Now, during the first operation of the machine, namely, the punching operation, the female die plate occupies the position of Fig. 9. Therefore, at such time it is desired that the male die end rods 73 shall be rapidly lowered to effect the punching operation. For this purpose, the press-head is lowered slowly, the gromet carrier in the mean time remaining in the rearward position of Figs. 4, 5, 8, and 20 to 24 inclusive, so as not to interfere with the die movements. By the time the press-head has lowered fairly close to the cloth, the male die will have been forced below the press-head by a more rapid lowering, so that it will enter the female die and punch the cloth. Thereafter, the male die will rapidly rise while the press-head rises slowly, so that the male die will draw up above the lower surface of the press-head, and the latter will strip the male die from the cloth. Afterward, the slidable plate 81 and female die will be moved forward into the position of Fig. 3 to provide a clear space for the riveting operation.

Figure 6:
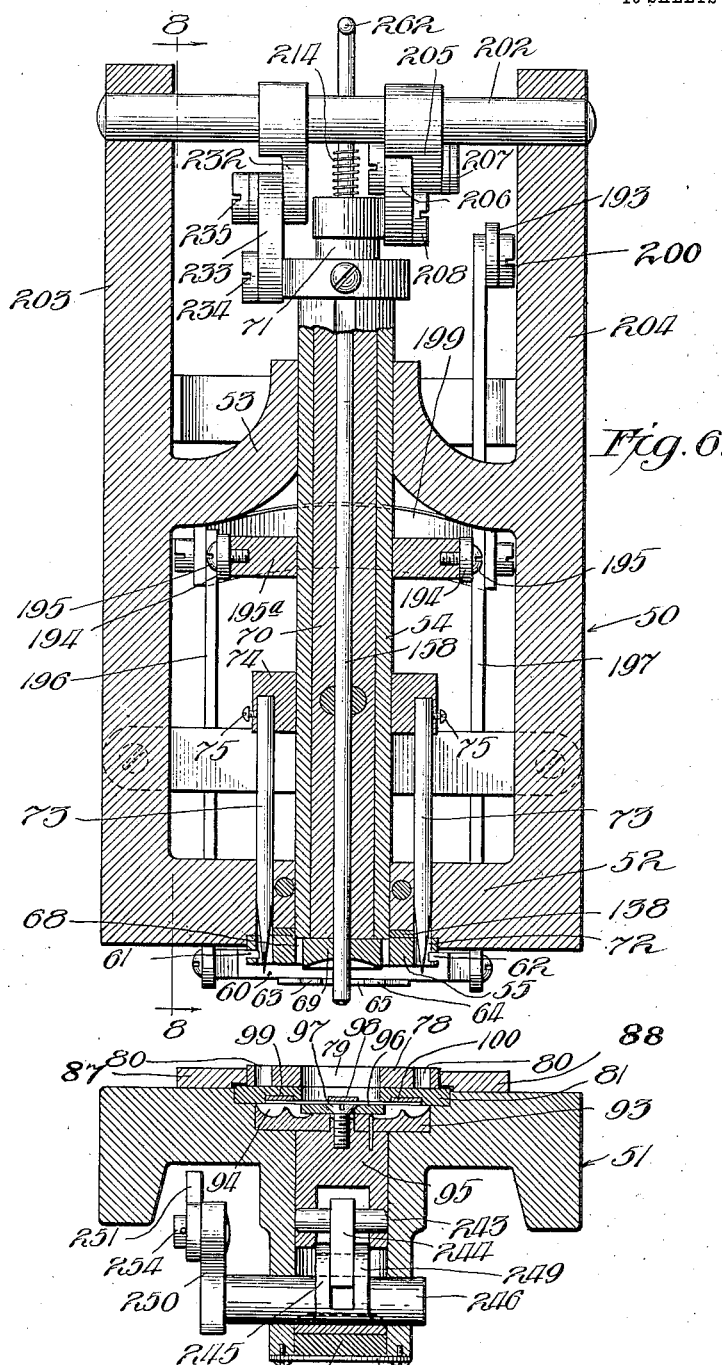

The slidable plate is provided immediately behind the female die plate with a large opening 92, so that, when the slidable plate is thrown forward into the position of Fig. 3, this opening will lie immediately under the press-head. The anvil comprises a member 93 having its upper surface formed to provide grooves 94, best shown in Figs. 4, 6, and 20 to 29 inclusive. These grooves are of such contour that the downwardly projecting ears or prongs of the gromet will all be forced inward toward the center of the gromet to thus insure clamping of all of these prongs. This anvil is carried by a block 95 which is vertically slidable in the cross piece 51, and which normally occupies a lowered position beneath the slidable plate, as best shown in Figs. 4 and 6.

When the slidable plate has been thrown forward into the position of Fig. 3, suitable mechanism raises the block 95 and anvil up through the opening 92. At the same time the press-head is forced down, the gromet carrier having been thrown forward in the mean time, so that the gromet which rests on the carrier and has its prongs downwardly extending, is caught between the press-head and the anvil. The gromet carrier is then caused to retreat backward, and subsequently the anvil and press-head are forced together to complete the riveting operation.

Now, as previously stated, this machine is particularly intended for placing eyelets which comprise the gromet and the washer. For this purpose, means are provided for introducing washers onto the anvil and properly centering them thereon prior to the riveting operation. This centering means comprises a plate 96 suitably secured to the anvil and block 95, as by means of a screw 97, and which plate is adapted to seat within the opening or hole of the washer. When the washer is slipped over this plate, it will be exactly centered on the anvil.

The washer feeding mechanism comprises a plurality of fingers 98, 99, and 100, all of which are connected at their rear ends by a cross piece 101, and which fingers are mounted between the slidable plate 81 and the member 51. The fingers preferably seat within slots in the lower face of the slidable plate and are well illustrated in Fig. 6, in which the fingers are seen in cross section.

As shown particularly in Fig. 4, the member 51 extends rearwardly a sufficient distance to provide a pocket 102 up through which the washers are fed. For this purpose, washers 103 are initially fed onto a guide rod 104, a spring 105 serving to force the washers up against the lower faces of the fingers of the feeding mechanism at all times. These fingers normally occupy the forward position, as shown in Figs. 4, 9, and 20 to 23 inclusive, so that the forward end of the finger 98 underlies the perforation of the female die and thus prevents the cut-away material from the cloth or fabric from falling down onto the anvil. A sweeping edge 106 on the slidable plate, best shown in Fig. 4, serves to sweep the cut-away material forward off the finger 98 and cause it to fall down through the opening 84 when the slidable plate and female die are thrown forward.

As shown particularly in Figs. 4, and 20 to 29 inclusive, the lower forward ends of the fingers are recessed from front to rear, so that, when the fingers are drawn back, as by pulling on the cross piece 101, when they reach their rearmost position, the spring 105 will cause the washers to rise a slight amount until the top washer 107 snaps up into the recesses in the lower faces of the fingers. Thereafter, when the fingers are thrown forward, this uppermost washer will be caught by the fingers and swept forward, until said washer 107 finally drops down over the plate 96, as shown particularly in Fig. 4. In this manner, washers are fed forward one at a time, and each of them is accurately centered on the anvil.

In order to insure an accurate limitation of movement of the fingers, the fingers 99 and 100 are provided with the forwardly and rearwardly extending slots 108 which engage the pins 109 of the member 51. By throwing the fingers into either extreme position as limited by these pins, their movement will be accurately limited forward and back.

As previously stated, the finger 98 serves to prevent the cut-away material from dropping down onto the anvil, and the edge 106 of the slidable plate serves to sweep such material off of said finger when said plate is thrown forward. Now, the forward movement of the slidable plate serves to remove the female die and carry the opening 92 over the anvil. Obviously, therefore, the fingers must be drawn backward before the anvil can be raised. But the operating mechanisms are so related that the backward movement of the fingers is delayed until after the sweeping operation has taken place, but said backward movement takes place in ample time before the anvil rises.

Means must be provided for feeding the gromets to the carrier one at a time and at proper instants. For this purpose, the cross piece 52 has its rear portion expanded out to provide the pocket 102ª, as best shown in Fig. 4. This pocket is of substantially the same shape and size as the gromet. It is located immediately over the rear end of the press-head, and immediately over the rearmost position of the gromet carrier, as is well shown in Figs. 11 and 12. Therefore, as the gromets are fed down through this pocket with their ears or prongs downwardly depending, they will drop immediately onto the carrier.

The gromets are initially fed onto a rod 111 in the manner shown particularly in Figs. 4, and 20 to 29 inclusive. This rod is connected at its upper end to a slotted rod 112, so that the rod 111 has a slight spring movement with respect to the slotted rod. The latter rod 112 is provided at its upper end with a hooked pin 113 adapted to be hooked down into the cross portion of a yoke 114, whose lower ends 115 and 116 are secured to the forward ends of the yokes 40 and 41. When thus hooked in position, the lower end 117 of the slotted rod seats in a definite relation with respect to the pocket into which the gromets are dropped. The lower end of the flexibly supported rod 111 is curved forward as at 118 to assist in straightening out the gromets, as they fall into the pockets.

It will be understood that the particular form of gromet best adapted for use in connection with these rods 111 and 112 is that form which is provided with four ears or prongs. The slot 119 of the slotted rod accommodates the rearmost prong of the row of gromets, so that the gromets are prevented from rotating on the rod or bar 111 and are caused to travel more evenly. A hook 120 is pivoted to the slotted rod at the point 121, as best shown in Fig. 4, so that the finger 122 of said hook may be swung forward across the slot and thus engage the protruding prong of the lowermost gromet to sustain the entire row of gromets in elevated position when the machine is not in use. Normally, however, this hook is swung to one side and out of the way, so that the prongs of the gromets can freely slide down the slot. In view of this fact, means must be provided for releasing the gromets one at a time, as otherwise they would all drop into the pocket and be sustained thereby. For effecting this feeding operation, I have provided an escapement 123 carried by the rod 124, best shown in Figs. 4, 5, and 20 to 29 inclusive. This escapement has the upper and lower fingers 125 and 126 offset from each other in the usual manner, so that by oscillation of the escapement back and forth the prong of a gromet will feed past it. Normally the rod 125 stands in such position that the protruding prong of a gromet rests on the lower finger 126, as shown in Figs. 4, and 20 to 22 inclusive. By oscillating the rod 124 in one direction, this lowermost gromet will be released and the next gromet will drop down until its protruding prong is arrested by the upper finger of the escapement. Now, the flexibly supported rod 111 extends through the central openings of all gromets. Also the gromets are seen to assume a position such that their forward prongs rest against the forward face of said rod. Therefore, as each gromet is released from the lower finger of the escapement its forward prong will strike against the outturned lower end 118 of the rod 111 and a blow will thus be delivered to the gromet which will straighten it out so that it will lie in a substantially horizontal position as it falls into the pocket 102$^a$.

Now, if no other mechanism were provided, each gromet as thus released will fall directly from the escapement mechanism to the gromet carrier, passing down through the pocket in the mean time. Owing to the necessity for straightening out the gromets as they fall it might some times happen that a gromet would not properly fall onto the carrier, so that the latter would not be able to perform its function in a proper manner. Therefore, I have provided mechanism for feeding the gromets through the pocket. This mechanism is best shown in Figs. 30 to 33 inclusive, in skeleton form, and associated with the pocket in Figs. 4 and 10. The mechanism comprises two sets of upper fingers 127—128 and 129—130, and two sets of lower fingers 131—132 and 133—134. The upper sets of fingers are adapted to travel toward and from each other in pairs, and the lower sets of fingers are adapted to travel toward and from each other in pairs, but the upper and lower sets travel in opposite directions at the same time. To accomplish this result, the upper fingers 127—128 comprise the ends of a U-shaped piece 135, and the upper fingers 129—130 comprise the ends of a U-shaped piece 136. A pin 137 effects a connection between the U-shaped member 136 and the forward end of a bar 138, the rear end of which bar provides the finger 132 of the lower set 131—132. A U-shaped piece 139 has its end 140 connected to the bar 138 and its other end constitutes the finger 131 of the pair 131—132. A U-shaped member 141 has its end 142 hooked into a recess of the forward end of the bar 143 which provides the finger 133 of the lower pair, the other end of said U-shaped member providing the finger 134 of the pair 133—134. The other end of the bar 143 is upturned at the point 144 and secured to the U-shaped piece 135. An arm 145 has its central portion secured to the lower end of the oscillating rod 124 which carries the escapement, so that, as said rod is oscillated, this arm 145 will be rocked. When the arm occupies the position of Figs. 32 and 33, the upper pairs of fingers will be drawn toward each other a sufficient distance to sustain a gromet, while the lower pairs of fingers will be drawn apart a sufficient distance to permit a previous gromet to drop past onto the carrier. On the other hand, when the rod 124 is oscillated, the arm 145 will be reversed in position into that shown in Figs. 30 and 31, so that the upper pairs of fingers will be separated, while the lower pairs are drawn together, thus permitting the gromet which previously rested on the upper pairs of fingers to drop through onto the lower pairs of fixtures, and be sustained by them.

In Figs. 20 to 29 inclusive, I have shown the several successive positions which the various mechanisms assume. When a gromet is sustained on the lower fingers of the escapement, as in Fig. 20, the lower pairs of fingers are together, while the upper ones are separated. When the rod 124 is rocked into its rear position, the lower pairs of fingers will be drawn apart to permit the gromet resting on them to drop onto the carrier. Simultaneously, the upper pairs of fingers will draw together and will have approached to such an extent before a gromet is released from the escapement, that when such release takes place this new gromet will drop onto the upper pairs of fingers, as in Fig. 23. At the same time the next gromet from the flexibly supported rod 111 will be caught on the upper finger of the escapement.

When the mechanisms reverse position, in changing from that of Fig. 28 to that of Fig. 29, the gromet which was on the upper pairs of fingers will drop to the lower pairs and the next succeeding gromet on the rod will be dropped from the upper finger of the escapement to the lower one.

Inasmuch as the fabric or cloth is first punched and the gromet is afterward set, means should be provided for gripping the fabric before the punching operation and securely holding it, so that it cannot move after being punched and before the gromet is set. Otherwise the gromet may not be properly located with respect to the hole of the fabric, and furthermore the prongs of the gromet would probably not pass through the cloth, unless properly lined up with the perforations caused by the rods 73. In order to securely hold the cloth or fabric, I have provided the shoes 146 and 147 which clamp the cloth against the member 51 at the beginning of an operation. Each of these shoes is of substantially U-shaped form having its legs 148 and 149 engaging the member 50 between them, so that they can slide up and down with respect to said member. Each of the legs is preferably slotted as at 150, tap nuts 151 being extended through these slots into the member 50 to guide the shoes in their vertical movements. A cross rod or shaft 152 extending between the yokes 40 and 41 carries the lever bar 153 at one side and the lever bar 154 at the other. A spring 155 tends to raise the rear end of the lever 153, thus depressing the forward end thereof, rotating the shaft, and likewise depressing the forward end of the lever 154. Means are provided for depressing the rear end of the lever 153 only when the machine stands in its normal position, thereby raising the forward ends of both levers against the tension of the spring. A link 155 extends from the forward end of each lever to the corresponding shoe, so that, when the rear end of the lever 153 is released, the spring will cause said lever to tilt in the other direction and depress the shoes. A spring connection 157 is provided in each of the links, so that each of the shoes will be flexibly pressed against the member 51, thus permitting the shoes to equalize their pressure on the fabric at both sides of the female die. The manner by which the lever arm 153 is raised against the tension of the spring for purposes of releasing the shoes from the fabric will presently appear.

In order to facilitate an accurate centering of the cloth or other fabric, so as to insure placing the eyelets at the proper points, I have provided an indicating rod. This is the rod 158 shown particularly in Figs. 4 and 6. It projects down through the rod 70 which raises and lowers the male die, but is slidably mounted within the same. Its lower end 159 extends down below the plane of the male die and press-head when the machine is standing idle. In such position, it would interfere with the back and forth movements of the gromet carrier. For this reason, means are provided for raising the indicating rod at the commencement of an operation, so that it rises into the dotted line position illustrated in Fig. 21. Thereafter, it remains in this raised position until a complete operation has been performed.

Having thus described the main operative elements of the herein illustrated embodiment of my machine, I will now proceed to describe the mechanisms which are herein disclosed for causing the several elements to go through a complete cycle of movements in the proper relative manner to perform a complete operation.

In the mechanism which is herein shown and described, I have adapted a system of cams for effecting such movements through the medium of links and other connections, but it will soon be apparent that it is in no wise necessary to use cams, and I have simply illustrated them as a simple mechanism for accomplishing the desired results. The several cams are keyed or otherwise secured to a main shaft 160 which spans the space between the yokes 40 and 41 and finds a bearing in them. Rotation of this shaft will rotate the cams and cause the several mechanisms to operate. For this purpose, a main gear 161 is loosely mounted on the shaft 160, being prevented from sliding off endwise from the same by means of a pin 162. This main gear carries on its inner face a clutch block 163, best shown in Fig. 2, which consequently rotates with the gear. By means of a train of gearing, including the pinion 164, gear 165, pinion 166, and gear 167, a reduction of speed is secured from a main fly wheel 168 which carries a pinion 169. Rotation of the fly wheel in the direction of the arrow will rotate the main gear in the direction of its arrow. A motor or other mechanism 170 is suitably secured to the frame of the machine and drives the fly wheel through the medium of a belt, or other connection 171.

By a continued application of power to the motor, the main gear 161 will be caused to rotate continuously, so that some form of clutch mechanism must be interposed between said main gear and the shaft 160 in order to control the operations of the eyeleting elements. For this purpose, a sleeve 172 rigidly secured to the main shaft carries a bell crank hook 173, the hook 174 of which is adapted to catch onto the block 163 of the main gear, when the bell crank is in proper position. A spring 175 tends to throw the bell crank in toward the shaft, so that it will be engaged by the block 163, and thus effect a driving connection between the main gear and the sleeve and consequently between the main gear and the main shaft. As long as the bell crank is allowed to maintain such position this driving connection will be continued. Means are provided for automatically disengaging the hook from the block at the end of a cycle, so that the machine will automatically run a single cycle or operation and will then require a manipulation on the part of the operator before the next cycle or operation will be effected. This means in the construction herein shown comprises a rod or arm 176 pivoted to the yoke 40 at the point 177, carrying at its upper end a pin 178 adapted to move into line with the free arm of the bell crank and arrest its movement, and normally thrown into such position by means of a spring 179. When this arm or bar 176 stands in the position shown in Fig. 1, the finger 178 will automatically arrest the movement of the eyeleting machine by disconnecting the main gear from the main shaft, because, as the bell crank hook travels up, its free arm will strike the pin 178, thereby arresting the same, and rotating the bell crank until its hook disengages from the block.

Any mechanism which will swing the arm 176 momentarily, will disengage the finger 178 from the free end of the bell crank, thus permitting the spring 175 to swing the bell crank on its pivot, and thus allow the hook to drop in toward the main shaft, so that it will be engaged by the block 163, when the same comes around in its rotation. Now, if the arm 176 were permanently swung and not allowed to drop back, the hook would remain in engagement with the block until the arm was allowed to swing back, so that the machine might operate a number of cycles. By reason of the fact that it is necessary to shift the cloth before each operation is performed and to accurately position the cloth by means of the indicating rod, it might easily happen that the next eyelet would not be properly placed, if the machine were to operate continuously. Therefore, I have provided means whereby in the normal operation of the machine the arm 176 is swung momentarily and then immediately released regardless of the fact that the operator may maintain his foot or arm on an operating pedal or handle, so that it will not be necessary for the operator to release the pedal or handle, but the machine will automatically stop when one complete cycle has been performed. Thereafter, it will be necessary for the operator to release the pedal or handle and again to press the same in order to again swing the arm 176 to effect another clutching operation.

The means herein disclosed for accomplishing this result comprises an arm 180 pivoted to the yoke 40 at the point 181 and carrying at its extreme end a finger 182 having its end 183 beveled and adapted to engage a pin 184 on the lower end of the arm 176 to force said pin sidewise, and thus swing the arm when the arm 180 is lowered. The finger 182 is pivoted to the arm 180 at the point 185, a spring 186 serving to normally raise the finger into the position illustrated, but permitting the finger to break in order to permit the arm 180 to swing out without again throwing the arm 176. A treadle or other device may be connected to a bar 187 of the arm, so that, when the pedal is depressed, the arm will be pulled down. Obviously, the operator may retain the arm in lowered position as long as desired, but the bar 176 will not be again operated until the pedal has been released to allow the arm to rise, so that, when the arm is again depressed, the bar 176 will be again swung.

The cam mechanism herein shown and described for effecting the several movements is adapted to secure positive drive in both directions—that is to say, I have not relied upon the use of a spring or other similar mechanism for restoring each of the main operative parts, but have provided cam mechanism for driving in both directions. For this purpose, a double cam is provided for each of the major movements. Each double cam or pair of cams operates through the medium of a yoke or other like device for securing the desired movements. The several cams and yokes are shown individually in Figs. 13 to 19 inclusive, in the relative positions which they occupy when the mechanism stands in the initial or normal position corresponding to that of Fig. 20. It will be understood, however, that, as the main shaft rotates, all of the cams rotate in unison as a group, and consequently the yokes are oscillated accordingly.

All of the yokes are mounted to oscillate or swing on a rod 188 extending between the side frames. This rod is almost directly beneath the main shaft. The cams and yoke of Fig. 13 operate the gromet carrier. For this purpose, the cam 189 holds the yoke in forward position during the first portion of the cycle, then the cam 190 swings the yoke to the left momentarily, and afterward the yoke is restored to its forward or initial position by the cam 189. The yoke 191, for this purpose, has an eye 192 which is pinned to a rod or link 193. A pair of links 194 are pivoted at the points 195 to a collar 195ª secured to the sleeve 54 which operates the press-head, arms 196 and 197 being pivoted at the points 198 to said links, so that they can swing back and forth with respect to the sleeve 54 and can also rise and fall with the same. A yoke 199 rigidly secures the arms together, so that they must rise or fall and swing as a unit. The arm 197 is continued upward and is pinned at the point 200 to the link 193, so that, as the latter is drawn forward and back by the carrier cams, the arms 196 and 197 will be swung forward and back according to the impulses from the cams. By means of the above construction, the gromet carrier is allowed to rise and fall with the press-head, but is controlled in its forward and back movements by the appropriate cams.

The cams and yoke of Fig. 14 control the movements of the male die and the rods 73. For this purpose, a bar or rod 202 extends between the upper ends of the upwardly extending arms 203 and 204 of the member 50. A crank 205 rotates freely on said bar being pinned to another crank 206 at the point 207. The latter crank 206 is pinned at the point 208 to the upper end 71 of the rod 70, so that the cranks 205 and 206 virtually constitute a toggle joint. The yoke 209 is provided with the eye 210 which is pinned to a stiff rod 211, the forward end of which is pinned to the toggle at the point 207. The cam 212 maintains the yoke at its left hand or rearward position initially, but shortly after the cycle commences the cam 213 swings the yoke to the right or forward position, thus driving the link 211 forward, and rapidly straightening out the toggle. This effects the punching operation. Afterward the yoke is rapidly thrown to the left, and thus the male die is rapidly raised for the stripping operation. Owing to the considerable angularity of the toggle in its upper position, a spring 214 presses down on the upper end 71 of the rod 70 to give the same a slight impulse when the punching operation commences.

The cams and yoke of Fig. 15 are for the purpose of actuating the slidable plate 81 which carries the female die. For this purpose, the cam 215 normally holds the yoke 216 in the position illustrated, and such position is maintained for approximately the first half revolution. Thereafter the cam 217 throws the yoke to the left which swings its lower end 218 to the right. The lower end of the yoke is pinned or otherwise connected to a flexible but fairly stiff driving link 219, the other end of which is secured to the slidable plate by means of a pin 220, best shown in Fig. 9. Obviously, the swinging of the yoke in this manner will carry the slidable plate toward the right or forward in the manner previously described. By providing a slight amount of excess movement in the cams of this mechanism and by making the bar 219 slightly flexible, assurance may be had that the slidable plate will be driven its extreme distance until limited by the engagement of the slots 90 with their pins 91.

The cams and yoke of Fig. 16 are for the purpose of actuating the gromet escapement and dropper. For this purpose, the cam 221 holds the yoke 222 normally to the right. This position is maintained during the first portion of the cycle, after which the cam 223 swings the yoke to the left or rear and holds it in such position during approximately one-half cycle. Then the yoke is again restored to its initial position. A rod or link 224 is pinned to the eye 225 of the yoke 222 and has its other end connected to a crank 226 properly secured to the oscillating shaft or rod 124. Swinging the yoke to the rear will draw back the crank 226, rotating the shaft or rod 124 to the left, and thereby operating the escapement and gromet feed. On restoring movement of the shaft, the gromet escapement and feed is completed.

The cams and yoke of Fig. 17 are for the purpose of actuating the washer feed. For this purpose, the cam 227 normally maintains the yoke 228 to the left or rearward position, so that its lower end 229 is normally thrown forward. This position is maintained for approximately the next half cycle, after which the position is reversed for approximately a half cycle, and the initial position is assumed just at the completion of the entire operation. The cam 230 serves to swing the yoke toward the right. A flexible bar or similar connection 231 establishes a connection between the lower end 229 of the yoke and the cross piece 101 of the fingers of the washer feed. It is desired that a slight excess of movement be given by the cams 227 and 230 in order to insure a complete forward and back movement of the washer feeding fingers.

The cams and yoke of Fig. 18 are for the purpose of actuating the press-head. For this purpose, a crank 232 is loosely mounted on the cross bar 202, and a crank 233 is pinned to the upper end of the sleeve or collar 54 at the point 234, and both of these cranks are pinned together at the point 235. Thus a toggle is provided by straightening out which the sleeve, press-head and gromet carrier will be lowered. A link or other connection 236 has its forward end pinned to the toggle at the point 235 and its rear end pinned to the yoke 237 at the point 238. In order to actuate this yoke, the cams 239 and 240 are provided. The former of these maintains the yoke normally to the left, so that the toggle is thrown back and the press-head is lifted. This position is maintained during the beginning of the cycle, but shortly thereafter the cam 240 swings the yoke rapidly to the right, thus effecting a comparatively rapid descent of the press-head. Afterward, the press-head rises slower than the male die to effect the stripping operation. Subsequently, the cam 240 again swings the yoke to the right until the point 241 of said cam is reached, at which point further movement of the yoke is momentarily arrested. At this instant, the gromet carrier is swinging back out of the way, having previously swung forward to carry a gromet beneath the press-head. When the gromet carrier has swung back the point 242 of the cam 240 comes into play and movement of the yoke toward the right is completed, thus finishing the riveting operation. Afterward, the yoke is again thrown to the left and maintained in its initial position.

The cam and yoke shown in Fig. 19 are for the purpose of raising and lowering the anvil. For this purpose, the anvil block 95 carries the cross pin 243, to which is pinned the link 244. A crank 245 has its lower end secured to a short rod 246, the lower face of which rod rests on a fairly stiff but compressible substance 247. The plate 248 is removably attached to the member 51, so that this substance, such as stiff rubber or the like, can be renewed from time to time. The crank and link are pinned together at the point 249, so that, when the rod 246 is rotated, said elements virtually constitute a toggle to raise the anvil. A crank 250 is rigidly connected to the rod 246, a link or the like 251 establishing communication between the lower end 252 of the yoke 253 and the crank 250. This is done by a pin connection 254.

The cam 255 normally holds the yoke to the left, so that its lower end is thrown forward and thus the toggle is bent and the anvil maintained in lowered position. Toward the latter portion of the cycle, the cam 256 commences to throw the yoke to the right and thus raises the anvil. However, this movement is arrested momentarily, when the point 257 of the cam is reached, at which instant the downward movement of the press-head was also arrested, to permit the gromet carrier to be moved out of the way. Afterward the point 258 of the cam 256 completes the throw of the yoke and thus completes the riveting operation. Then the yoke is restored to its normal position and the operation is complete.

For the purpose of raising and lowering the indicating rod, the arm 259 is pivoted to the yoke 40 at the point 260. This arm has its forward end 261 bent inward and hooked to the upper end 262 of the indicating rod. A spring 263 normally lowers the rear end of the arm 259, thus raising the indicating rod out of the way. However, just as the cycle of operations is completed a pin 264 on the outer face of the cam 255 strikes the rear end of the arm 259 to raise the same and thus lower the indicating rod.

In order to release the shoes 146 and 147 a pin 265 on the outer face of the cam 189 releases the arm 153 at the commencement of the cycle of operations, so that the spring 155 can lower the shoes, and they will be retained in lowered position until the cycle is practically completed.

The sequence of movement of the several mechanisms will be readily understood from an examination of Figs. 20 to 29 inclusive. As soon as the clutch comes into action and the main shaft and cams commence to rotate the indicating rod will be released and will rise up and out of the way. At the same time the clamping shoes will be dropped to clamp the fabric firmly on both sides of the female die. Immediately thereafter the press-head and gromet carrier will commence to descend, but the male die and rods 73 will descend more rapidly than the press-head, so that these will enter the female die to effect the punching operation before the press-head has completed its descent. The press-head and carrier will then commence to rise slowly, but the male die and rods 73 will rise rapidly, so that they will soon draw up above the lower surface of the press-head to strip the cloth from the male die. When the press-head has risen nearly its full amount, the dropping mechanism will reverse position to release a gromet from the lower fingers of the dropping mechanism and allow such gromet to drop down and be supported by the carrier. By the same operation the gromet which was supported on the lower finger of the escapement will be released, and will drop down and be supported by the upper fingers of the dropping mechanism. Also the entire row of gromets on the rod 111 will move down until the lowermost of them rests upon the upper finger of the escapement. Immediately thereafter the female die will move rapidly forward out of the way of the anvil, at the same time sweeping the previously punched material from the finger 98 of the washer feeding mechanism, and carying such material forward to drop into a suitable receptacle. In the meantime, the fingers of the washer feeding mechanism will commence to travel backward and will soon reach their rearmost position, so that the spring 105 will raise the entire row of washers, the uppermost snapping into the recesses in the lower faces of the finger rod to be fed forward at the end of the cycle. In the meantime, the press-head and gromet carrier will commence to move down, and simultaneously the gromet carrier will move forward until the gromet carried by it is accurately centered beneath the press-head, being limited in its forward movement by the edges 58 and 59 of the projections 56 and 57 of the press-head. Then the anvil will start to move up to meet the press-head, and the press-head and anvil will continue to approach each other until the prongs of the gromet are securely gripped between these members. The movement of these members will then be arrested momentarily, and the carrier will be thrown back with a rapid movement, leaving the gromet supported between the press-head and the anvil. When the carrier has moved back a sufficient distance, the press-head and anvil will continue their approach toward each other, at the same time bending or riveting the prongs of the gromet, which prongs will bend under the washer which was sustained by the anvil, thereby riveting these two members of the eyelet together. The press-head will then travel rapidly upward, raising the gromet carrier with it, the latter at this time standing in its rearmost or normal position. As soon as the press-head reaches its uppermost position, the dropping mechanism will be thrown back into its original or normal position, the gromet which was sustained by the upper fingers of the dropper will pass through to the lower fingers thereof, and the row of gromets sustained on the rod 111 will be allowed to fall until the lowermost of the row is sustained upon the lower finger of the escapement.

When the riveting operation took place, the washer which was supported on the anvil from a previous operation was riveted to the gromet, the cloth being clamped between these two members. The female die will now be drawn back into its rearmost or normal position, and simultaneously the washer feeding fingers will be thrown forward to sweep the topmost of the row of washers forward until it is deposited on the anvil, being properly centered thereon by the plate 96. This washer will be the washer to be used in the next operation.

The eyeleting operation being now completed, the shoes will be released so as to release the cloth or fabric, the indicating rod will drop to its lower position, and immediately afterward the clutch will unhook, so that the mechanism will stand ready to perform the next operation, when the clutch is again actuated.

Of course, the clutch might be dispensed with, so that the main elements would operate continuously, but such a mode of operation would be dangerous, because of the possibility of not being able to properly center the fabric in time for the next operation, and because of the danger that a second eyelet might be attempted to be placed immediately over the first one, so that the machine would be damaged, because of the necessity for punching the metal of the previously set eyelet. Therefore, it is desirable to use some form of clutching mechanism or other like device for disconnecting or cutting off the source of power after each eyeleting operation is completed.

I do not in any wise restrict myself to the mechanisms herein shown and described, except as called for in the claims, but I contemplate within the scope of my invention any equivalent mechanisms operating in an equivalent manner to produce an equivalent result.

I claim:

1. In a machine of the class described, the combination of a press-head, a male die mounted within the press-head and adapted to have longitudinal movement with respect to the same, an anvil disposed in line with the press-head, a female die mounted for transverse movement with respect to the line of movement of the press-head and adapted to coöperate with the male die for a punching operation, means for feeding washers one at a time to the anvil, means for feeding gromets one at a time beneath the press-head, means for actuating the male die, means for shifting the female die transversely, and means for actuating the press-head to rivet a gromet between the press-head and the anvil, substantially as described.

2. In a machine of the class described, the combination of a press-head, a male die mounted within the same and adapted to have longitudinal movement with respect to the same, an anvil beneath the press-head, a female die adapted to have transverse movement with respect to the press-head and anvil and adapted to coöperate with the male die for a punching operation, means for feeding gromets one at a time beneath the press-head, means for feeding washers one at a time to the anvil, means for actuating the male die to effect a punching operation, means for actuating the press-head for a stripping operation, and means for subsequently actuating the press-head for a riveting operation, substantially as described.

3. In a machine of the class described, the combination of a press-head, a male die mounted within the same and adapted to have longitudinal movement with respect to the same, an anvil beneath the press head, a female die adapted to have transverse movement with respect to the press-head and anvil and adapted to coöperate with the male die for a punching operation, means for feeding gromets one at a time beneath the press-head, means for actuating the male die to effect a punching operation, means for actuating the press-head for a stripping operation, and means for subsequently actuating the press-head for a riveting operation, substantially as described.

4. In a machine of the class described, the combination of a press-head, a male die mounted within the same and adapted to have longitudinal movement with respect to the same, an anvil in line with the press-head, a female die mounted for transverse movement with respect to the anvil and press-head and adapted to coöperate with the male die for a punching operation, means for feeding washers one at a time to the anvil, means for feeding gromets one at a time to the press-head, means for actuating the male die to effect a punching operation, means for forcing the press-head toward the anvil, and means for forcing the anvil toward the press-head to effect a riveting operation, substantially as described.

5. In a machine of the class described, the combination of a vertically movable press-head, a vertically movable anvil disposed in line with the press-head, a vertically movable male die mounted within the press-head, a transversely movable female die mounted for movement into and out of the path of movement of the male die and adapted to coöperate with the male die for a punching operation, means for feeding washers one at a time to the anvil, means for feeding gromets one at a time beneath the press-head, means for actuating the male die to effect a punching operation, means for shifting the female die transversely, and means for forcing the press-head and anvil toward each other to effect a riveting operation, substantially as described.

6. In a machine of the class described, the combination of a press-head mounted for movement in a vertical direction, a gromet carrier mounted for transverse movement with respect to the press-head, means for feeding gromets one at a time to the gromet carrier, a male die within the press-head mounted for vertical movement with respect to the same, an anvil beneath the press-head, a female die mounted for transverse movement between the anvil and the press-head, means for feeding washers one at a time to the anvil, means for actuating the male die to effect a punching operation, means for shifting the female die transversely, means for shifting the gromet carrier transversely with respect to the press-head to carry a gromet into riveting position, means for forcing the press-head and gromet carrier toward the anvil, means for retracting the gromet carrier, and means for completing the movement of the press-head toward the anvil to complete a riveting operation, substantially as described.

7. In a machine of the class described, the combination of a press-head, a gromet carrier slidably mounted on the same, means for feeding gromets one at a time to the gromet carrier, a male die mounted for vertical movement within the press-head, an anvil mounted for vertical movement beneath the press-head, a female die mounted for transverse movement and adapted to coöperate with the male die for a punching operation, means for actuating the male die to effect a punching operation, means for shifting the female die sidewise after the punching operation, means for raising the anvil, and means for lowering the press-head, after the female die is shifted sidewise, to effect a riveting operation, substantially as described.

8. In a machine of the class described, the combination of a press-head mounted for vertical movement, a male die mounted for vertical movement within the press-head, an anvil beneath the press-head, a female die mounted for transverse movement between the anvil and the press-head and adapted to coöperate with the male die for a punching operation, means for actuating the male die to effect a punching operation, means for shifting the female die transversely, means for feeding washers one at a time to the anvil, and means for accurately centering the washers on the anvil, substantially as described.

9. In a machine of the class described, the combination of a press-head mounted for vertical movement, a gromet carrier mounted on the press-head and adapted to have transverse movement with respect to the same, a male die mounted for vertical movement within the press-head, means for feeding gromets one at a time to the gromet carrier, an anvil beneath the press-head, a female die mounted for transverse movement between the press-head and anvil and adapted to coöperate with the male die for a punching operation, means for actuating the male die to effect a punching operation, means for shifting the female die transversely after the punching operation, means for actuating the gromet carrier to place a gromet in line between the press-head and anvil, and means for forcing the press-head toward the anvil, substantially as described.

10. In a machine of the class described, the combination of a press-head mounted for vertical movement, means for punching a fabric to sever a portion of the same, a gromet carrier mounted for transverse movement on the press-head, means for feeding the gromets one at a time to the gromet carrier, an anvil, means for actuating the gromet carrier to support a gromet between the press-head and anvil, and means for actuating the press-head to carry a gromet into the punched portion of the fabric and to rivet the gromet, substantially as described.

11. In a machine of the class described, the combination of a vertically movable press-head, a transversely movable gromet carrier adapted to carry a gromet and support the same beneath the press-head, an anvil, dropping mechanism for dropping gromets one at a time onto the gromet carrier, and an escapement for feeding the gromets one at a time to the dropping mechanism, substantially as described.

12. In a machine of the class described, the combination of a vertically movable press-head, a transversely movable gromet carrier adapted to convey and support a gromet beneath the press-head, an anvil mounted in co-active relation with respect to the press-head, and dropping mechanism for feeding gromets one at a time to the carrier, substantially as described.

13. In a machine of the class described, the combination of a vertically movable press-head, a gromet carrier adapted to convey and support a gromet beneath the press-head, an anvil mounted in co-active relation with respect to the press-head, horizontally movable members adapted to control the movement of gromets to the gromet carrier, and mechanism for feeding gromets one at a time to said horizontally movable mechanisms, substantially as described.

14. In a machine of the class described, the combination of a vertically movable press-head, a transversely movable gromet carrier adapted to convey and support a gromet beneath the press-head, an anvil mounted in co-active relation with respect to the press-head, horizontally movable members adapted to transfer gromets one at a time to the gromet carrier, and an escapement mechanism for feeding the gromets one at a time to the horizontally movable members, substantially as described.

15. In a machine of the class described, the combination of a vertically movable press-head, a transversely movable gromet carrier adapted to convey and support a gromet beneath the press-head, an anvil mounted in co-active relation with respect to the press-head, horizontally movable members adapted to feed gromets one at a time to the gromet carrier, a member on which the gromets are strung, and an escapement mechanism for controlling the release of gromets from said last mentioned member to the horizontally movable members, substantially as described.

16. In a machine of the class described, the combination of a vertically movable press-head, a gromet carrier adapted to convey and support a gromet beneath the same, an anvil mounted in co-active relation with respect to the press-head, upper and lower horizontally movable sets of fingers for controlling the feed of gromets to the gromet carrier, a member on which the gromets are strung, and an escapement mechanism for controlling the release of gromets from said last mentioned member to the upper sets of horizontally movable members, substantially as described.

17. In a machine of the class described, the combination of a vertically movable press-head, a gromet carrier adapted to convey and support a gromet beneath the press-head, upper and lower horizontally movable oppositely disposed fingers for controlling the feed of gromets to the gromet carrier, a member on which the gromets are strung, and an escapement mechanism for controlling the release of said gromets from said last mentioned member to the upper horizontally movable sets of fingers, substantially as described.

18. In a machine of the class described, the combination of a pair of pressing members mounted in co-active relationship, a horizontally movable gromet carrier adapted to convey and support a gromet in position between said members, and mechanism for feeding gromets one at a time to said gromet carrier, substantially as described.

19. In a machine of the class described, the combination of a pair of pressing members mounted in co-active relationship, a gromet carrier adapted to convey and support gromets between said pressing members, horizontally movable members adapted to control the movement of gromets to said gromet carrier, a member on which the gromets are strung, and mechanism for releasing the gromets one at a time from said last mentioned member, substantially as described.

20. In a machine of the class described, the combination of a gromet carrier, horizontally movable pairs of fingers for controlling the feeding of gromets to said gromet carrier, a member on which gromets are strung, and mechanism for releasing the gromets from said member to the horizontally movable pairs of fingers, substantially as described.

21. In a machine of the class described, the combination of a gromet carrier, horizontally movable oppositely disposed upper and lower sets of fingers for controlling the release of gromets to the gromet carrier, a member on which the gromets are strung, and an escapement mechanism for controlling the release of gromets from said last mentioned member to the upper sets of horizontally movable fingers, substantially as described.

22. In a machine of the class described, the combination of a gromet carrier, horizontally movable oppositely disposed upper and lower sets of fingers for controlling the release of gromets to the gromet carrier, a member on which the gromets are strung, a portion whereof is adapted to engage a portion of a gromet in its downward descent to deliver a blow thereto, whereby a gromet is straightened out to lie in horizontal position, and means for releasing the gromets one at a time from said last mentioned member, substantially as described.

23. In a machine of the class described, the combination of a gromet carrier having a plurality of horizontally disposed separated fingers, oppositely disposed sets of horizontally movable upper and lower fingers for controlling the release of gromets to said gromet carrier, whereby the gromets are supported by the gromet carrier with their prongs downwardly depending, a member on which the gromets are strung, and means for releasing gromets one at a time from said last mentioned member to the upper sets of horizontally disposed fingers, substantially as described.

24. In a machine of the class described, the combination of a vertically movable press-head, an anvil mounted beneath the same, a central projection on the anvil, a male die mounted for vertical movement within the press-head, a female die mounted for horizontal transverse movement between the anvil and the press-head, means for supporting a pile of horizontally disposed perforated washers adjacent the anvil, a horizontally movable member adapted to sweep the uppermost washer from said pile and transfer the same sidewise to cause its perforation to encircle the aforementioned central projection, and a portion of said female die in position to sweep the cut-away material from the aforementioned horizontally movable member and carry such material sidewise beyond the anvil, substantially as described.

25. In a machine of the class described, the combination of a vertically movable press-head, an anvil beneath the same, a male die vertically movable within the press-head, a plurality of punching rods surrounding the male die, means for causing the said rods and male die to rise and fall together, and a horizontally movable female die in position to co-act with the male die and said rods, substantially as described.

26. In a machine of the class described, the combination of a vertically movable press-head, an anvil mounted in position to co-act therewith, a vertically movable male die slidably mounted within the press-head, a plurality of punching rods surrounding the male die, means for causing the male die and said rods to rise and fall together, and a horizontally movable female die having perforations adapted to accommodate the male die and the punching rods, substantially as described.

27. In a machine of the class described, the combination of a vertically movable press-head, a member in which the same is mounted for vertical movement, said last mentioned member being provided with a gromet pocket, a gromet carrier mounted for horizontal movement beneath said pocket and press-head, upper and lower sets of oppositely disposed fingers within said pocket for controlling the descent of a gromet therethrough, a vertical member on which the gromets are strung, and means for controlling the escapement of gromets from said vertical member into the pocket, substantially as described.

28. In a machine of the class described, the combination of a vertically movable press-head having a pair of downwardly extending projections in its forward portion, a member in which said press-head is mounted for vertical movement, there being a gromet pocket in said member, a gromet carrier adapted to move horizontally beneath the press-head and said pocket, upper and lower horizontally movable oppositely disposed sets of fingers in the walls of said pocket for controlling the descent of a gromet therethrough, a vertical member on which the gromets are strung, and an escapement for controlling the release of gromets from said member into the pocket, substantially as described.

29. In a machine of the class described, the combination of a vertically movable sleeve, a member in which said sleeve is mounted for vertical movement, a press-head on the lower end of said sleeve, there being a gromet pocket in said member located to one side of the sleeve, a rod slidably mounted within the sleeve, a male die on the lower end of said rod, a plurality of punch rods encircling said male die, a collar to which said punch rods are secured, there being a vertically extending slot in the first mentioned sleeve, a pin secured to the vertically movable rod, a connection between said pin and the collar, whereby the encircling punch rods rise and fall with the male die, a gromet carrier movable in a horizontal direction beneath the male die, press-head, and pocket, means for controlling the passage of a gromet through said pocket, and means for feeding gromets one at a time into the upper end of said pocket, substantially as described.

30. In a machine of the class described, the combination of a vertically movable press-head, a vertically movable sleeve to which the same is secured, a horizontally movable gromet carrier associated with the press-head and adapted to carry and support a gromet beneath the press-head, links pivotally secured to the vertically movable sleeve to which the press-head is secured, vertically extending arms pivoted to said links, pivotal connections between the lower ends of said arms and the gromet carrier, whereby as said arms are swung on the links the gromet carrier will travel horizontally with respect to the press-head, and means for actuating said arms to swing the carrier, substantially as described.

31. In a machine of the class described, the combination of a vertically movable press-head, a male die vertically movable within the same, an anvil mounted in line with the press-head, a female die horizontally movable between the press-head and the anvil, an indicating rod vertically movable within the male die and adapted to extend below the same, a horizontally movable carrier between the press-head and anvil, and means for raising the indicating rod above the lower surface of the press-head to thereby provide a clearance for the gromet carrier, substantially as described.

32. In a machine of the class described, the combination of a vertically movable press-head, a male die vertically movable within the same, an anvil located in co-active relationship with the press-head, a horizontally movable female die between the anvil and the press-head, and adapted to coöperate with the male die for a punching operation, and means for clamping a fabric at the sides of the female die, substantially as described.

33. In a machine of the class described, the combination of a vertically movable press-head, a male die vertically movable within the press-head, an anvil mounted in co-active relationship with the press-head, a female die horizontally movable between the anvil and the press-head, and adapted to coöperate with the male die for a punching operation, means for clamping a fabric at the sides of the female die, means for actuating the male die to effect a punching operation, means for shifting the female die to one side, means for actuating the press-head for a riveting operation, and means for subsequently releasing the clamping members, substantially as described.

JEREMIAH KELLER.

Witnesses:
 THOMAS A. BANNING, Jr.,
 EPHRAIM BANNING.